United States Patent [19]

Imoto et al.

[11] 4,123,242
[45] Oct. 31, 1978

[54] APPARATUS FOR PRODUCING OPTICAL FIBER

[75] Inventors: Katsuyuki Imoto, Sayama; Yoshitaka Takasaki, Tokorozawa; Masao Sumi, Higashiyamato, all of Japan

[73] Assignee: Hitachi, Ltd., Japan

[21] Appl. No.: 815,447

[22] Filed: Jul. 13, 1977

[30] Foreign Application Priority Data

Jul. 19, 1976 [JP] Japan ............................ 51-85083

[51] Int. Cl.$^2$ .................................................... C03B 37/02
[52] U.S. Cl. ............................................... 65/11 W; 65/2; 65/12; 65/13; 65/29; 65/164; 65/DIG. 7; 356/73
[58] Field of Search ................. 65/2, 11 W, 12, 13, 65/29, DIG. 7, 164; 356/73

[56] References Cited

U.S. PATENT DOCUMENTS

| | | | |
|---|---|---|---|
| 3,879,128 | 4/1975 | Presby | 65/2 X |
| 3,890,127 | 6/1975 | Siegmund | 65/13 X |
| 4,030,901 | 6/1977 | Kaiser | 65/13 X |

*Primary Examiner*—Robert L. Lindsay, Jr.
*Attorney, Agent, or Firm*—Craig & Antonelli

[57] ABSTRACT

Apparatus for producing an optical fiber including apparatus for heating an optical fiber preform, apparatus for drawing out the optical fiber from the optical fiber preform whose fore end part has been made molten by the heating and for taking up the drawn out fiber, apparatus for causing a gas to flow along the outer peripheral surface of the molten part of the optical fiber preform, and apparatus for controlling both the flow rate of the gas and the drawing-out speed of the optical fiber according to a fluctuation in the diameter of the optical fiber. The controlling apparatus includes (i) a fiber diameter detector and a fiber diameter measuring device which detect and measure the diameter of the optical fiber drawn out, (ii) a fiber diameter controlling circuit which receives an output of the fiber diameter measuring device and a reference value for specifying a fiber diameter and which compares them so as to deliver an output for controlling the fiber diameter, (iii) a gas flow rate controller which is driven by the output for controlling the fiber diameter, and (iv) a take-up speed controller which is driven by the output for controlling the fiber diameter. With this apparatus, the optical fiber of uniform diameter can be easily produced.

6 Claims, 14 Drawing Figures

APPARATUS FOR PRODUCING OPTICAL FIBER

BACKGROUND OF THE INVENTION

1. Field of the Invention

This invention relates to apparatus for producing an optical fiber. More particularly, it relates to apparatus for producing an optical fiber wherein an optical fiber preform (hereinbelow, simply termed "preform") is heated by a heater arrangement, and one end of the preform in the molten state is drawn so as to obtain an optical fiber of uniform predetermined diameter.

2. Brief Description of the Prior Art

For an optical fiber which is used as a transmission line of optical signals in an optical communication system, a severe uniformity in the fiber diameter is required in order to render the transmission loss ultralow.

Figures 1, 2A:
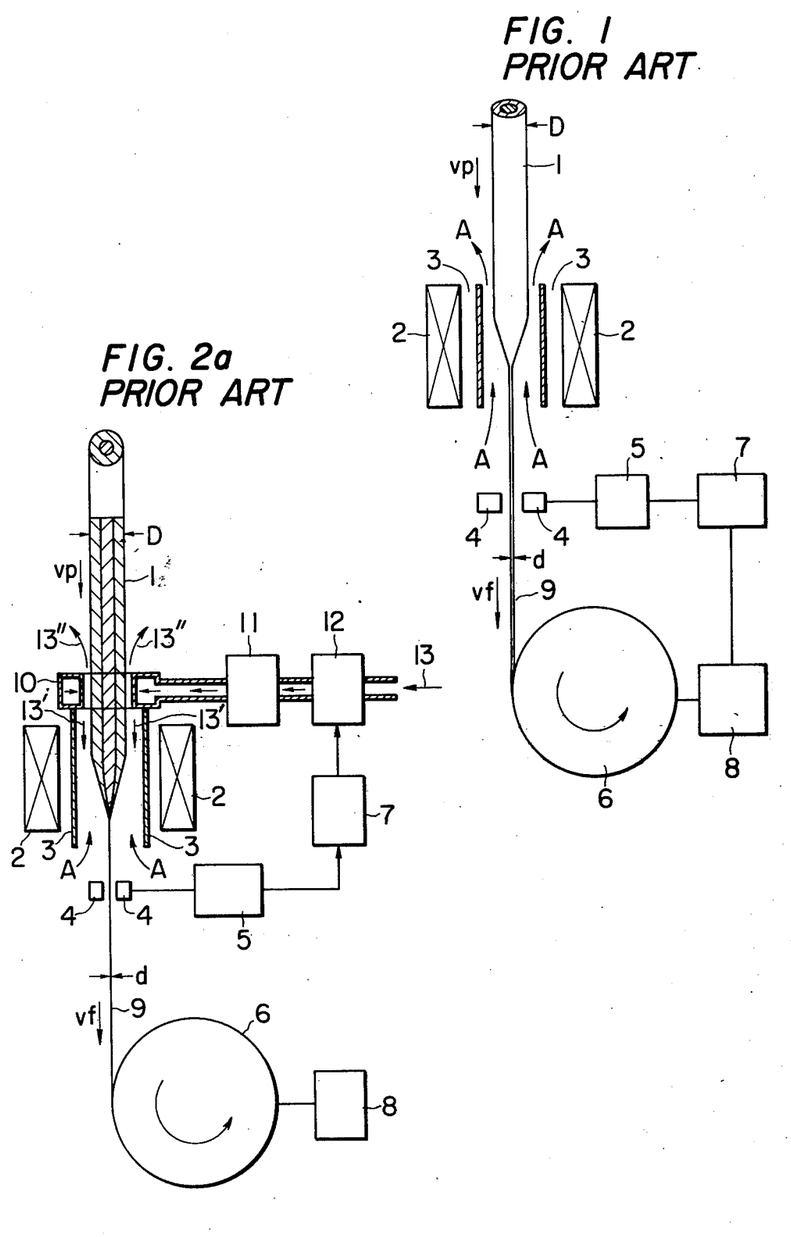
FIGS. 1, 2a and 2b are explanatory views each of which shows the construction of prior art apparatus or apparatus in pending applications for producing an optical fiber.

The uniformity in the diameter of an optical fiber depends on a drawing machine for the optical fiber. Heretofore, the preform process has been mainly adopted for the drawing of the ultralow loss optical fiber, and an apparatus as shown in FIG. 1 has been employed. The process uses as an optical fiber material a pipe or rod, i.e. a preform which is separately prepared and which is made of one or more layers of vitreous material. The preform 1 (having an outside diameter D) is inserted at a fixed speed $v_p$ into a protection tube 3 in a furnace heated by a heating source 2. The lower end part of the preform heated and molten is drawn out, and is taken up round a drum 6. A motor (not shown) is driven while being controlled by a motor controller 8. Thus, the drum 6 is rotated and winds an optical fiber 9 thereon while elongating it at a fixed speed $v_f$. In this way, the optical fiber 9 having a predetermined outside diameter $d$ is formed. The diameter $d$ of the optical fiber 9 is detected by an optical non-contact type fiber detector 4, and is indicated on a fiber diameter measuring device 5. In the presence of a fluctuation in the diameter, the fiber diameter control is carried out in such a way that an analog output of the fiber diameter measuring device 5 is fed to a fiber diameter controlling circuit 7 wherein it is processed by comparison with a signal corresponding to a set diameter value to produce an output signal of the control circuit which is fed to the motor controller 8 to change the rotational speed of the drum 6 (corresponding to changing the speed $v_f$). With the fiber diameter controlling method, the fiber diameter fluctuations amounted to ± several % and it was difficult to suppress the fluctuations below the values.

The prior art method was studied by Katsuyuki Imoto et al from various viewpoints, as well as investigating the mechanism of fiber diameter fluctuations. As the result, it was revealed that factors for the fiber diameter fluctuations are broadly classified into the following two types: (1) structural imperfections of the preform (variations in the outside diameter, offset of the axis, inclination of the axis, etc.) and (2) fluctuations in the preform melting temperature during the drawing as are attributed to disturbances based on the factor (1) (changes in air current A flowing within the protection tube) and disturbances based on external factors (changes in air current A flowing within the protection tube).

Fiber diameter fluctuations due to the factor (2) often occurred during the drawing, and they amounted to ± several % to ± several tens %. Moreover, the time constant at the fiber diameter fluctuations was in the order of second, so it was revealed that the suppression of the fiber diameter fluctuations to below ± 2 to ± 3% is difficult even by changing the take-up speed $v_f$. Katsuyuki Imoto et al have therefore previously proposed an optical fiber drawing machine which can suppress the fiber diameter fluctuations due to the factor (2) (Japanese Patent Application No. 142055/1975) and apparatuses for controlling the diameter of an optical fiber which control the fiber diameter so as to reduce the fiber diameter fluctuations due to the factor (1) while suppressing the fiber diameter fluctuations due to the factor (2) (Japanese Patent Applications Nos. 151825/1975 and 29960/1976). U.S. patent application Ser. No. 744,454 and West German Patent Application P 26 53 836.3-45 which correspond to these Japanese patent applications were respectively filed Nov. 23, 1976 and Nov. 26, 1976.

Figure 2B:
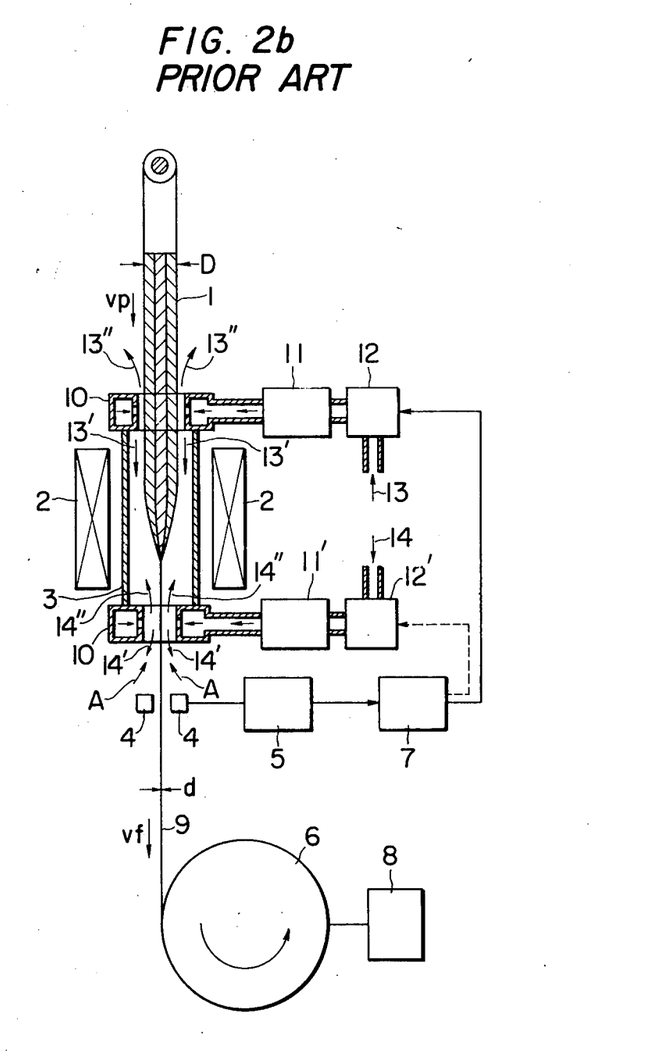

Examples of the apparatus for controlling the fiber diameter are shown in FIG. 2a and FIG. 2b. Referring to the figures, numeral 10 (10') designates a gas conduit (gas curtain device) which is mounted on the upper part (lower part) of a protection tube 3. The gas curtain device controls the flow rate of a fed and introduced gas 13 (14) by a valve regulator 12 (12') and forces the gas to flow out into the protection tube so as to suppress air current A flowing into the protection tube from the exterior. While thus suppressing the fiber diameter fluctuations due to the factor (2) as far as possible, the gas curtain device controls the fiber diameter fluctuations due to the factor (1) by changing the flow rate of the gas, to reduce the fiber diameter fluctuations. More specifically, it is the same as in the case of FIG. 1 that the fiber diameter fluctuation is detected by a fiber diameter detector 4 and that an analog output (digital output) from a fiber diameter measuring device 5 is fed into a fiber diameter controlling circuit 7 (provided that the construction of the control circuit differs). It is different from the case of the prior art apparatus in that an output signal from the fiber diameter controlling circuit 7 is utilized to control a valve regulator 12 (12') for controlling the gas flow rate.

In the figures, numeral 11 (11') denotes a gas flow meter. Numerals 13', 13", 14' and 14" indicate streams of the gas.

In the figures, the same symbols represent the same or functionally equivalent components such that additional descriptions are not provided.

In the case of FIG. 2b, there are two aspects; one aspect in which the output of the control circuit 7 is fed back to the valve regulator 12 (solid line) for controlling the gas flow rate, and the other aspect in which it is fed back to the valve regulator 12' (dotted line) for controlling the gas flow rate. According to this control method, usually one gas flow rate is fixed when the other gas flow rate is being controlled.

Figure 3A:
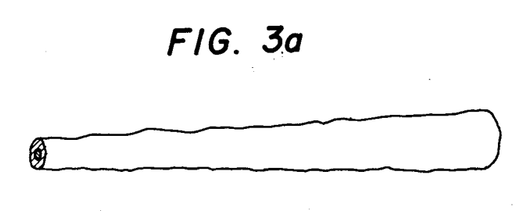
FIGS. 3a, 3b and 3c are explanatory views each of which shows an example of the shape of a preform having outside diameter fluctuations.
Figure 3B:
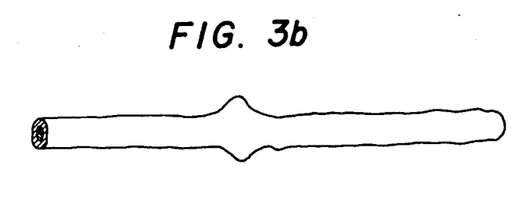
Figure 3C:
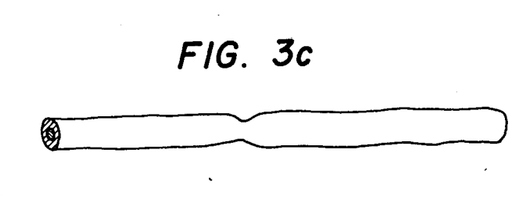

It was experimentally confirmed that, with the apparatus in FIG. 2a or FIG. 2b, even when the outside diameter variations of the preform are approximately ± 2%, the fiber diameter fluctuations of the optical fiber can be very stably controlled to approximately ± 1%. The apparatus accordingly proved to be an extraordinarily effective control mechanism. However, in the case where the outside diameter of the preform varies taperingly in the lengthwise direction thereof as shown in FIG. 3a, where the outside diameter is extremely large at a part in the lengthwise direction as shown in FIG. 3b, where the outside diameter is small at a part as shown in FIG. 3c, or further, in the case where a desired fiber diameter value to be initially set in the fiber diameter control circuit 7 is erroneous, a phenomenon in which the gas flow rate deviates sharply from the initially set value arises when the fiber diameter control is being conducted by changing the value of the gas flow rate. As the result, an influence is exerted on the temperature in the protection tube, to change the temperature of the molten part of the preform during the drawing of the optical fiber or to change a tension acting on the optical fiber at the drawing. This leads to the difficulties that the optical fiber comes to have inhomogeneous characteristics in the lengthwise direction thereof and that the fiber diameter control becomes impossible in extreme cases.

SUMMARY OF THE INVENTION

It is accordingly an object of this invention to provide apparatus for producing an optical fiber as is equipped with a fiber diameter controlling mechanism free from the above-mentioned difficulties.

In order to accomplish the object, the apparatus for producing an optical fiber according to this invention includes (1) apparatus for heating a preform, (2) apparatus for drawing out the optical fiber from the preform whose fore end part has been made molten by the heating and for taking it up round a drum, (3) apparatus for causing a gas to flow along the outer peripheral surface of the molten part of the preform, and (4) apparatus for regulating both the flow rate of the gas and the drawing-out speed of the optical fiber according to a fluctuation in the diameter of the optical fiber, the regulating apparatus including (i) a fiber diameter detector which detects the diameter of the optical fiber drawn out, (ii) a fiber diameter measuring device which measures the optical fiber diameter detected by the detector, (iii) a fiber diameter controlling circuit which receives an output of the fiber diameter measuring device and a reference voltage to specify a desired fiber diameter and which compares them and amplifies the difference to deliver an output for controlling the fiber diameter, (iv) a gas flow rate controller which is driven by the output for controlling the fiber diameter, and (v) an optical fiber take-up speed controller which is driven through a take-up speed controlling circuit by a signal corresponding to the output for controlling the fiber diameter.

The apparatus for heating a preform, the apparatus for drawing out the optical fiber and for taking it up round a drum, the apparatus for causing a gas to flow, the kind of the gas, the flow rate of the gas, the fiber diameter detector, the fiber diameter measuring device, the fiber diameter controlling circuit, and the gas flow rate controller are the same as those described in the aforecited U.S. patent application Ser. No. 744,454 or West German Patent Application P 26 53 836.3-45.

Now, a description will be made of the optical fiber diameter-controlling mechanism in the optical fiber producing apparatus according to this invention.

In the apparatus of this invention, when the diameter of the optical fiber has deviated from a preset diameter value, an error signal outputted from the fiber diameter controlling circuit is fed back to the gas flow rate controller so as to change the flow rate of the gas by $\Delta F$ (which is a function of the time and the amount of change of the fiber diameter) from the flow rate value F initially set, and simultaneously, the error signal is passed through the take-up speed controlling circuit so as to control the take-up speed of the optical fiber by an output thereof, whereby the flow rate of the gas is prevented from sharply deviating from the gas flow rate value F initially set. Although the error signal may be inputted directly into the take-up speed controlling circuit, it may be inputted through a low-pass filter so as to eliminate unnecessary high-frequency components.

Regarding the flow rate of the gas, which is also applicable to the cases of the apparatuses in FIGS. 2a and 2b, any desired value F which can suppress an ascending current or disturbing current flowing naturally from outside the protection tube is first set. A fiber diameter fluctuation of short period ascribable to the structural imperfections of the preform is corrected by changing the gas flow rate slightly about the first set value F, while a fiber diameter fluctuation of long period is corrected by changing the take-up speed as in the apparatus of FIG. 1.

As the result, while continually changing the value of the gas flow rate by $\pm \Delta F$ ($\Delta F$ being an arbitrary value necessary for the fiber diameter control) with respect to F during the drawing of the optical fiber, the control can be made so as to suppress the diameter fluctuations of the optical fiber. Therefore, the optical fiber which has more homogeneous characteristics in the lengthwise direction thereof can be obtained.

Figure 4:
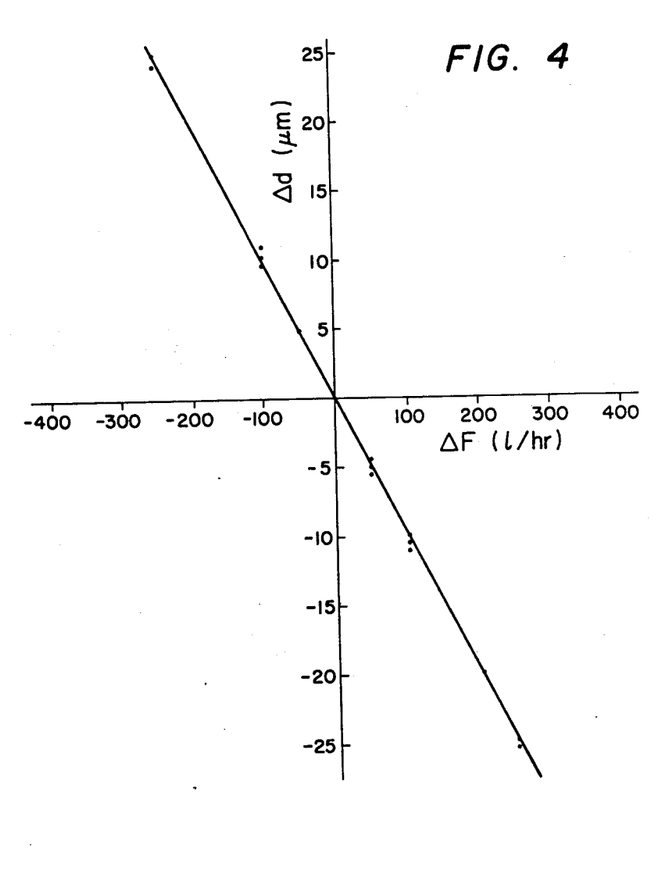
FIG. 4 is a graph showing the relationship between the amount of variation in the flow rate of a gas and the amount of fluctuation in the diameter of an optical fiber.

FIG. 4 shows an example of the characteristic of the diameter variation of an optical fiber versus the variation of a gas flow rate. It corresponds to a case where the gas was introduced from above the protection tube as shown in FIG. 2a. The graph was obtained in the following manner. Under the conditions where the preform feed speed $v_p$ and the take-up speed $v_f$ were hold constant and a preform of constant outside diameter D was employed, the gas flow rate was changed by $\Delta F$ in a stepped manner about the flow rate value F first set. Then, the fiber diameter changed by $\Delta d$ at very quick response and returned to the original value. The maximum values $\Delta d$ of the diameter changes of the optical fiber at such time were plotted. It is understood from the graph that the fiber diameter changes and the gas flow rate changes are in a proportional relation. This relationship between $\Delta F$ and $\Delta d$ changes greatly in dependence on the flow rate value F initially set, the direction in which the gas flows, the temperature in the protection tube, etc., and characteristic curves of multifarious gradients are obtained in dependence on the measuring conditions. It has been made sure, however, that both the quantities $\Delta F$ and $\Delta d$ are proportional at all times. It is therefore apparent that the diameter fluctuations of the optical fiber can be controlled by changing the gas flow rate transiently and infinitesimally by exploiting the above relation. In the case of FIG. 4, the preform feed speed $v_p$ was 7.1 mm/min., the take-up speed $v_f$ was 38 m/min., the outside diameter D of the preform was 8 mm, and the diameter $d$ of the fiber was 110 $\mu$m (average value).

As stated previously, in order to control the take-up speed of the optical fiber, a voltage corresponding to the error signal outputted from the fiber diameter controlling circuit is inputted to the take-up speed controlling circuit. At this time, a reference voltage for setting a reference take-up speed (take-up speed specifying or setting reference voltage) is simultaneously inputted. The two input signals are compared and the difference is amplified into a take-up speed controlling output. With this output signal a motor controller is driven, to control the revolutional speed of a motor for rotating the drum. The take-up speed controlling circuit may be a well-known circuit which has been employed for comparing such voltages or currents. The control of the revolutional speed of the drum rotating motor may be replaced with an expedient in which a capstan for drawing out the fiber is provided between the preform and the drum and in which the revolutional speed of a motor for rotating the capstan is controlled.

DESCRIPTION OF THE PREFERRED EMBODIMENTS

Figure 5:
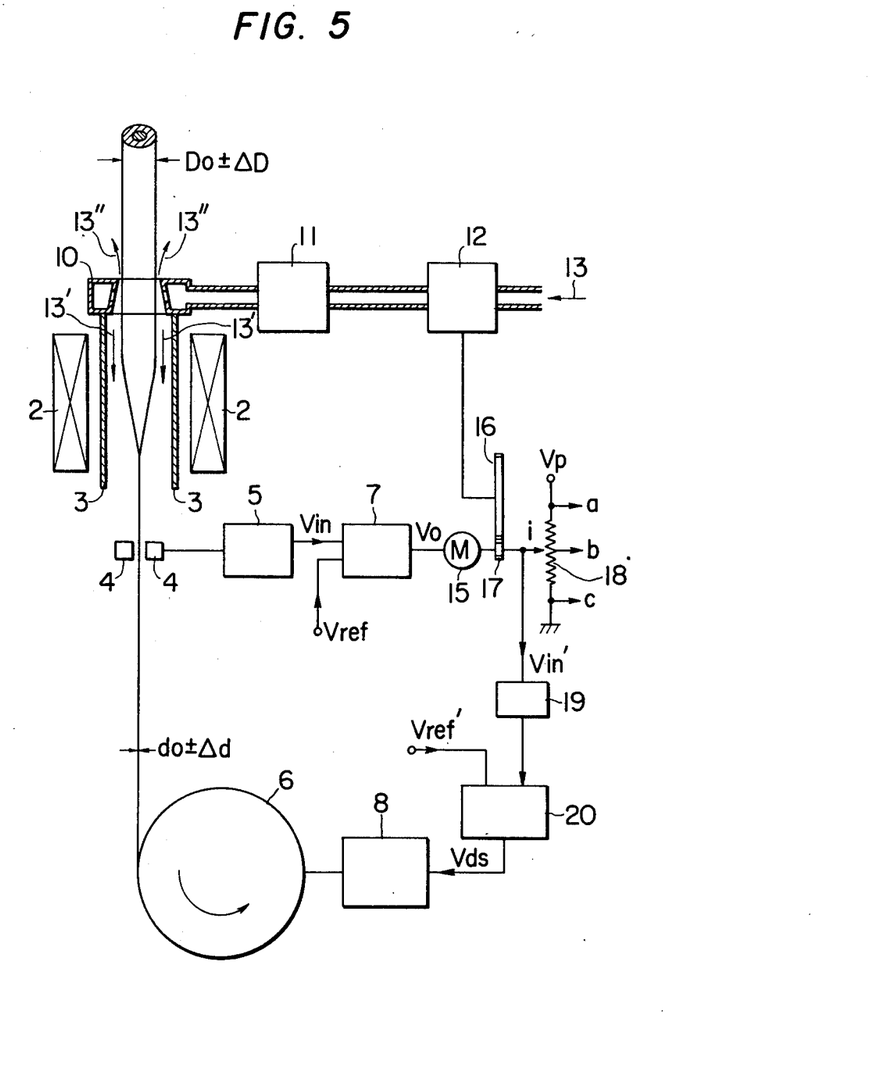
FIG. 5 shows the construction of an embodiment of apparatus for producing an optical fiber according to this invention.

FIG. 5 shows the schematic construction of an embodiment of apparatus for producing an optical fiber according to this invention. In this apparatus, the diameter control of the optical fiber is carried out as stated below. First of all, a desired diameter set value $d_{ref}$ is determined in accordance with a preform feed speed $v_p$, a take-up speed $v_f$ and a preform outside diameter $D$ (their values at this time are denoted by $v_{po}$, $v_{fo}$ and $D_o$, respectively), and it is converted into the form of a voltage or a reference voltage $V_{ref}$. On the other hand, a fiber diameter $d_{in}$ detected by a detector 4 and a fiber diameter measuring device 5 is similarly converted into a voltage, which is denoted by $V_{in}$. The voltages $V_{ref}$ and $V_{in}$ are inputted to a fiber diameter controlling circuit 7. Here, they are compared and the difference is amplified. In the case where an error signal voltage occurs (where $V_{in} \neq V_{ref}$), a voltage $V_o$ is generated at the output end of the fiber diameter controlling circuit 7. Herein, when $V_{ref} > V_{in}$, the voltage $V_o$ is positive, and when $V_{ref} < V_{in}$, it is negative. The voltage $V_o$ is used as a driving voltage for a motor 15 (while a d.c. motor is employed in this case, a pulse motor or a servomotor may well be adopted). A shaft for a spur gear 17 and a potentiometer 18 is directly coupled to the shaft of the motor 15. With the spur gear 17 a spur gear 16 meshes which is directly coupled to a valve regulating shaft in a valve regulator 12 for controlling the gas flow rate. Accordingly, when the voltage $V_o$ is applied to the motor 15, the valve regulating shaft of the valve regulator 12 for controlling the gas flow rate is rotated through the spur gears 17 and 16. Thus, the flow rate of a gas to be fed into a protection tube 3 in a furnace is controlled, and the diameter of the optical fiber is controlled. On the other hand, the indication in the case where the preset value of the flow rate of the gas having been caused to flow through the interior of the protection tube 3 before conducting the fiber diameter control is F is given in advance by a position symbolized by a point $b$ of the potentiometer 18 directly coupled to the shaft of the motor 15. When the voltage $V_o$ is applied to the motor 15, the position of the potentiometer is changed within a range of from a point $a$ to a point $c$ about the point $b$ in response to the applied voltage $V_o$. An applied voltage of the potentiometer, $V_p$ is given across both the ends $a$ and $c$ of the potentiometer 18, and a voltage between the point $b$ and the earth point $c$ (a reference voltage for setting a reference take-up speed) at this time is denoted by $V_{ref}'$. A voltage $V_{in}'$ at a point $i$ (in the case where the flow rate value of the gas to be fed into the protection tube 3 is F, $V_{in}' = V_{ref}'$ as stated previously) is inputted to a low-pass filter 19. The low frequency component of the voltage $V_{in}'$ as passed through the low-pass filter 19 is inputted to a take-up speed controlling circuit 20. Also inputted to the take-up speed controlling circuit 20 is the voltage $V_{ref}'$. The control circuit 20 compares the low frequency component of the voltage $V_{in}'$ and the voltage $V_{ref}'$ and amplifies the difference, and its output signal $V_{ds}$ is used to drive a motor controller 8 (although not shown, a d.c. motor is employed as a motor for driving the rotation of a drum 6) so as to control the take-up speed $v_f$.

The control method will now be described. In the case where the low frequency component of the voltage $V_{in}'$ and the voltage $V_{ref}'$ are equal, the take-up speed controlling circuit is set so that its output voltage is a voltage $V_{dso}$ for setting the take-up speed of the optical fiber to the value $v_{fo}$ (take-up speed for establishing the desired diameter set value $d_{ref}$). When a positive voltage is produced in the motor 15 (that is, when $V_{ref} > V_{in}$), the low frequency component of the voltage $V_{in}'$ becomes greater than the voltage $V_{ref}'$. Conversely, when a negative voltage is produced in the motor 15 (that is, when $V_{ref} < V_{in}$), the low frequency component of the voltage $V_{in}'$ becomes smaller than the voltage $V_{ref}'$.

When the low frequency component of the voltage $V_{in}'$ becomes greater than the voltage $V_{ref}'$, the take-up speed controlling circuit operates so as to render its output voltage smaller than the value $V_{dso}$, whereby the take-up speed controlling circuit 20 acts to decrease the take-up speed $v_f$ of the optical fiber until the low frequency component of the voltage $V_{in}'$ and the voltage $V_{ref}'$ become equal. Conversely, when the low frequency component of the voltage $V_{in}'$ becomes smaller than the voltage $V_{ref}'$, the take-up speed controlling circuit operates so as to render its output voltage greater than the value $V_{dso}$, whereby the take-up speed controlling circuit 20 acts to increase the take-up speed of the optical fiber until the low frequency component of the voltage $V_{in}'$ and the voltage $V_{ref}'$ become equal. Owing to the control operation as described above, the control mechanism functions so that the change of the position $i$ of the potentiometer may always become zero. Therefore, notwithstanding that the fiber diameter control is being conducted by changing the gas flow rate, the gas flow rate fluctuates in $F \pm \Delta F$ even in the case where the preform as shown in any of FIGS. 3a to 33c is employed or where the initial fiber diameter setpoint has been erroneous. The fluctuating gas flow rate can always hold values close to the gas flow rate value F initially set.

Figure 6:
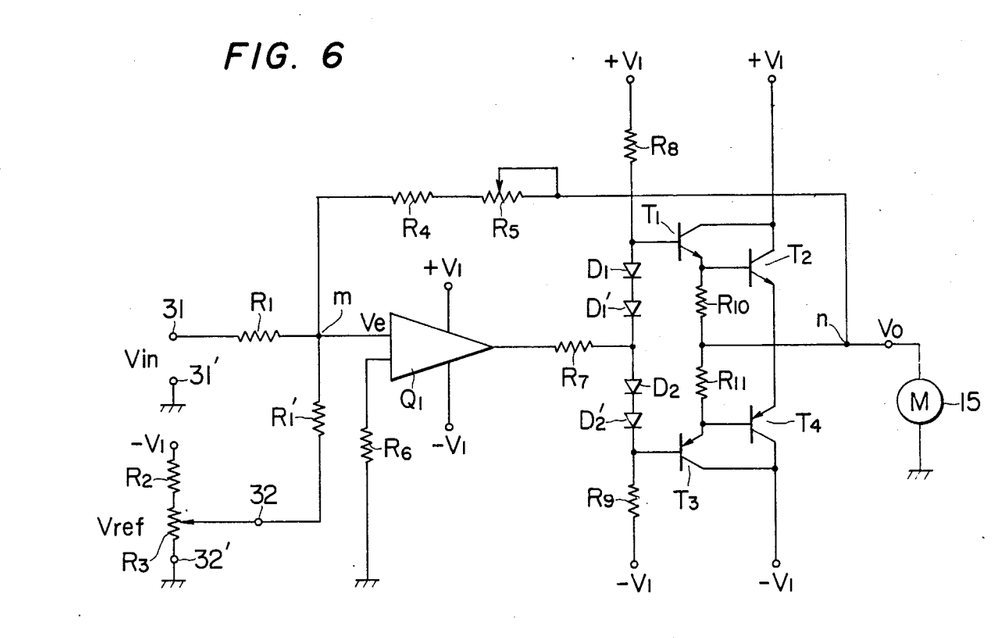
FIG. 6 is a circuit diagram of a fiber diameter controlling circuit for use in the apparatus for producing an optical fiber according to this invention.

FIG. 6 shows an example of the fiber diameter controlling circuit 7. The input voltage applied between terminals 31 and 31' (the output of the fiber diameter measuring device 5) $V_{in}$ and the reference voltage $V_{ref}$ previously set between terminals 32 and 32' are added at a point $m$, and the resultant signal $V_e$ is made an input signal to an operational amplifier $Q_1$. The signal $V_e$ is amplified by the operational amplifier $Q_1$ (the gain is determined by $(R_4 + R_5)/R_6$). Further, depending on the polarity of the voltage $V_e$, a current amplifier of the Darlington connection type consisting of transistors $T_1$ and $T_2$ or transistors $T_3$ and $T_4$ operates to amplify the voltage $V_e$ so that the voltage $\pm V_o$ for driving the motor 15 is obtained at a point $n$. The voltage at the point $n$ is fed back to the point $m$ through resistances $R_4$ and $R_5$, and the motor 15 is driven to control the gas flow rate so that the voltages $V_{in}$ and $V_{ref}$ may always become equal. Here, $R_1$ and $R_1'$ designate input resistances; $R_2$ and $R_3$ resistances for generating the reference voltage; $R_7$ a resistance for preventing the short-circuit of the output terminal; $D_1$, $D_1'$ and $D_2$, $D_2'$ diodes for cutting off the operations of the transistors $T_1$, $T_2$ and $T_3$, $T_4$, respectively, $R_8$ and $R_9$ resistances for supplying constant currents; and $R_{10}$ and $R_{11}$ bias resistances. Shown at $+V_1$ and $-V_1$ are supply voltages of the control circuit.

Figure 7:
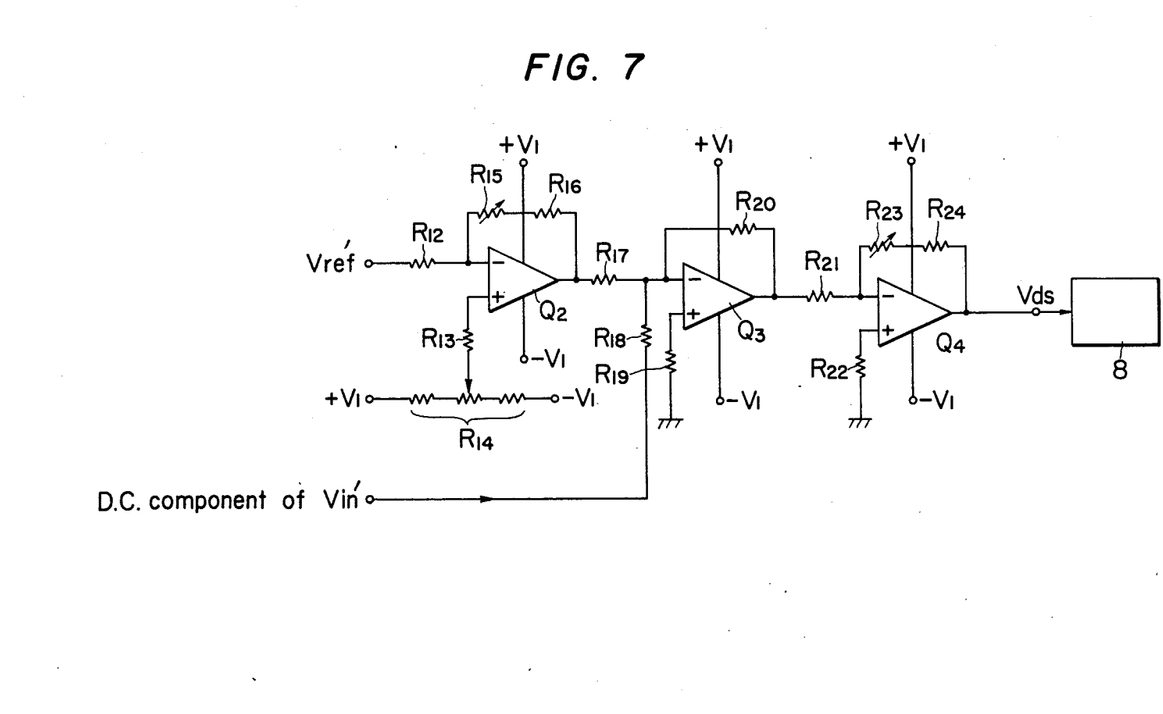
FIG. 7 is a circuit diagram of a take-up speed controlling circuit for use in the apparatus for producing an optical fiber according to this invention.

FIG. 7 shows an embodiment of the take-up speed controlling circuit 20. The circuit arrangement is such that the input signal $V_{ref}'$ is amplified by a comparator and amplifier made of an operational amplifier $Q_2$ and that the output signal of the operational amplifier $Q_2$ and the signal of the low frequency component of the voltage $V_{in}'$ are added and operated by an operational amplifier $Q_3$. The output signal of the operational amplifier $Q_3$ is amplified by an operational amplifier $Q_4$, to obtain the output signal $V_{ds}$. The gains of the operational amplifiers $Q_2$ and $Q_4$ are set so that the signal $V_{ds}$ may offer the take-up speed $v_{fo}$ of the optical fiber when the voltage $V_{ref}'$ and the low frequency component of the voltage $V_{in}'$ are equal. The gain of the operational amplifier $Q_2$ is proportional to $(R_{15} + R_{16})/R_{13}$, while that of the operational amplifier $Q_4$ is proportional to $(R_{23} + R_{24})/R_{22}$. Resistances $R_{19}$ and $R_{20}$ are selected to be equal. $R_{12}$, $R_{17}$, $R_{18}$ and $R_{21}$ denote resistances for matching. $R_{14}$ denotes a resistance for setting the reference input voltage of the operational amplifier $Q_2$.

Figure 8A:
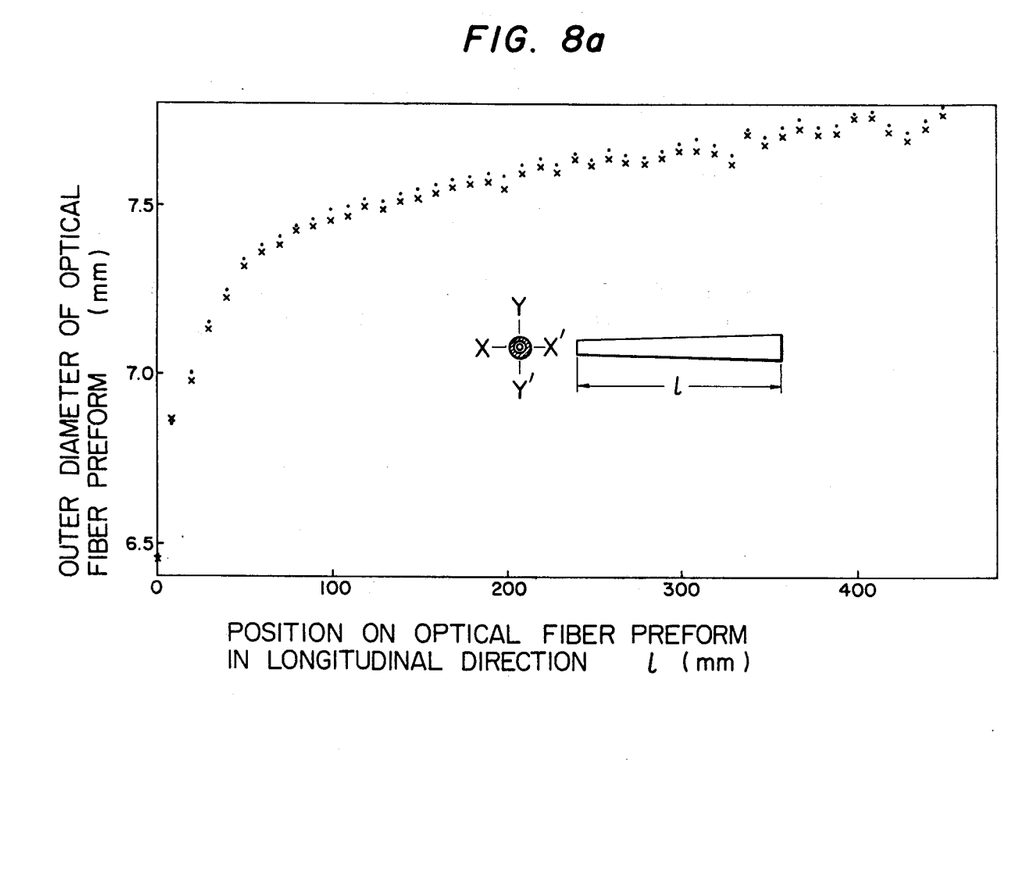
FIG. 8a is a diagram which shows an example of outside diameter fluctuations of a preform.
Figure 8B:
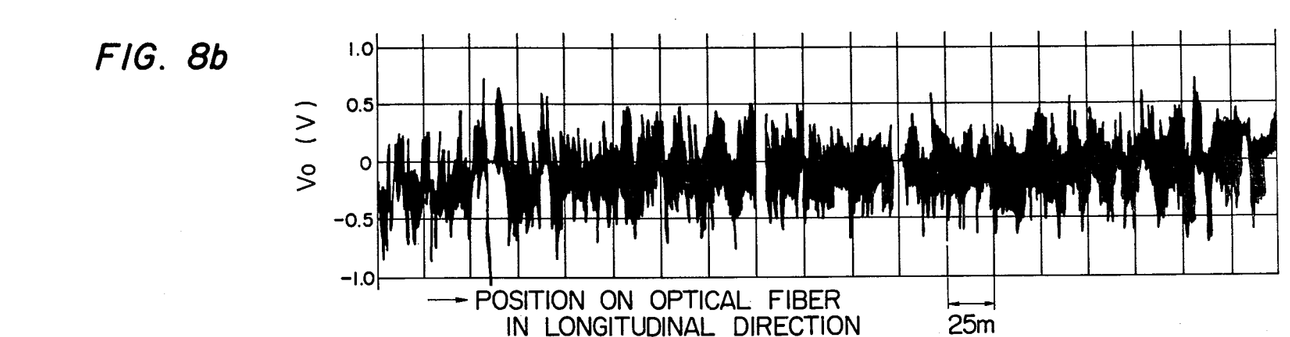
FIG. 8b is a diagram which shows fluctuations in the output of the fiber diameter controlling circuit in the case where the preform of the shape illustrated in FIG. 8a is drawn by the optical fiber producing apparatus of this invention.
Figure 8C:
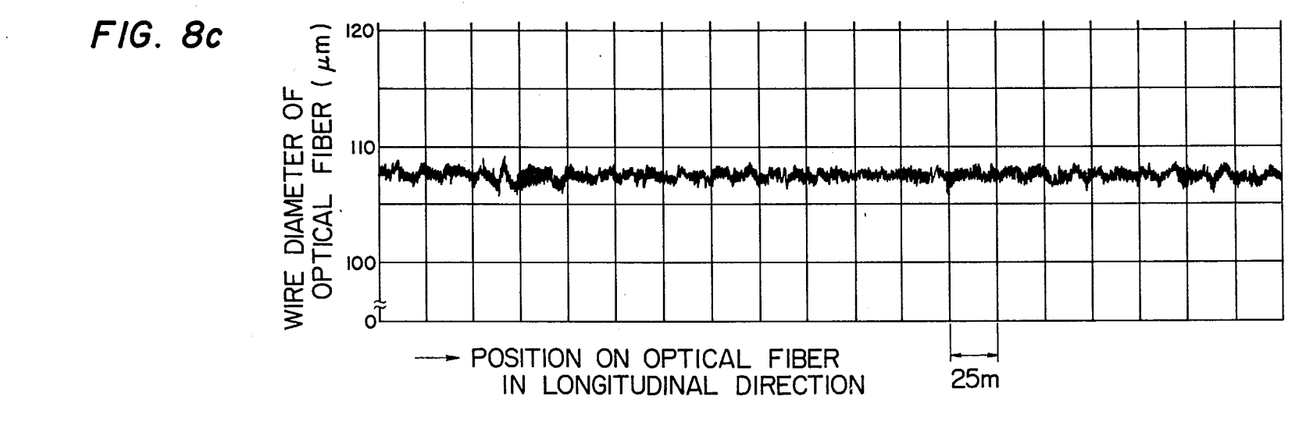
FIG. 8c is a diagram which shows the characteristic of the diameter fluctuations of an optical fiber in the case where the preform of the shape illustrated in FIG. 8a is drawn by the optical fiber producing apparatus of this invention.

FIGS. 8b and 8c are graphs of the results in the case where a tapered optical fiber preform as shown in FIG. 8a was drawn by the apparatus of this invention. Referring to FIG. 8b, the output $V_o$ of the fiber diameter controlling circuit 7 fluctuated within a range of $\pm \Delta V$ in the vicinity of 0 volt, that is, the value F to which the gas flow rate had been initially set scarcely fluctuated. Simultaneously, as apparent from FIG. 8c, the fiber diameter fluctuations were very small. These results indicate that an extraordinarily effective diameter control is executed. Further, it has been proven that the optical fiber obtained with this apparatus is also excellent in mechanical strength, transmission loss, stress-induced additional loss, etc. In FIG. 8a, mark ". " indicates the outside diameter in a direction $X - X'$, and mark "x" indicates the outside diameter in a direction $Y - Y'$.

As understood from the above embodiments, the fiber diameter controlling mechanism of the optical fiber producing apparatus of this invention is characterized in that as the flow rate of the gas forcibly fed in between the optical fiber material (preform) and the heating source is being changed according to the fiber diameter fluctuations of the optical fiber, it is controlled so as to reduce the diameter fluctuations of the optical fiber, while at the same time the take-up speed of the optical fiber is controlled so as to suppress the initial set value of the gas flow rate from fluctuating. Owing to the optical fiber producing apparatus equipped with such fiber diameter controlling mechanism, it has become possible to realize an optical fiber which is homogeneous in the lengthwise direction thereof, which is of high quality (small fiber diameter fluctuations, low stress-induced additional loss, high mechanical strength, etc.) and which exhibits an excellent transmission characteristic. The optical fiber producing apparatus of this invention and the fiber diameter controlling mechanism therefor are not restricted to the foregoing embodiments. The embodiment shown in FIG. 5 is such that the invention is applied to the apparatus of FIG. 2a, but the invention is similarly applicable to the apparatus of FIG. 2b, etc.

When the drawing-out speed $v_f$ of the optical fiber exceeds 500 m/min., the heating of the perform becomes difficult, and when it is below 10 m/min., the production speed is too low and is unpractical. Usually, therefore, it is desirable to set the drawing-out speed $v_f$ within a range of 10 m/min. $<v_f<$ 500 m/min.

Figure 9:
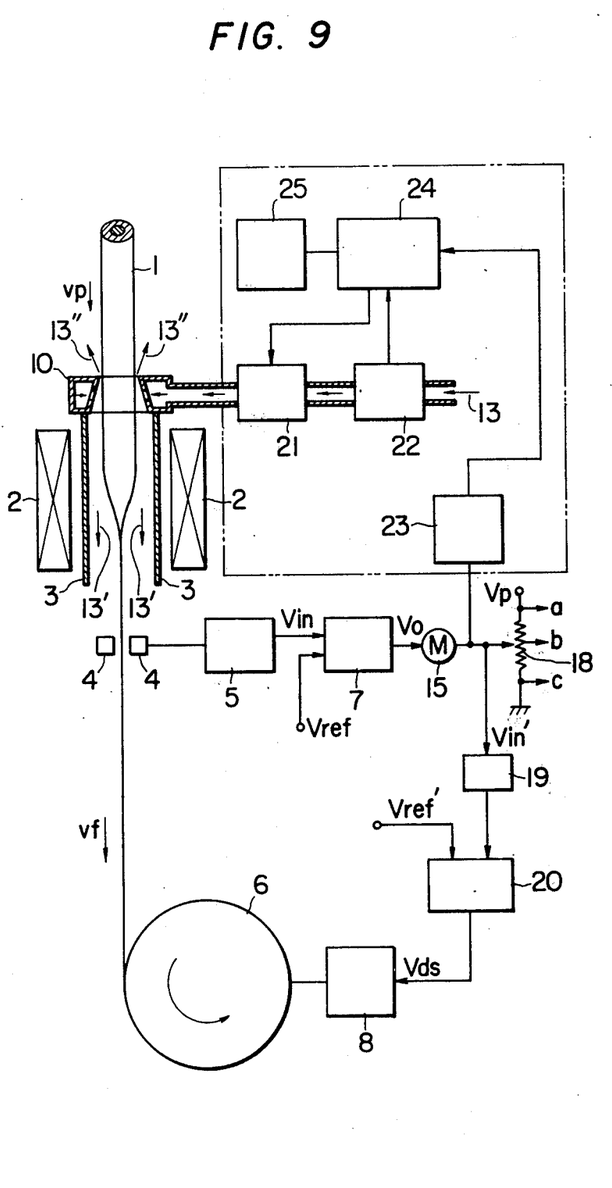
FIG. 9 shows the construction of another embodiment of the apparatus for producing an optical fiber according to this invention.

When, for example, a mass-flowmeter is used as the gas flow rate controller and the gas flow rate sensor, the gears, valve regulator, etc. as previously mentioned need not be employed. An example thereof is shown in FIG. 9. A portion enclosed with broken lines in FIG. 9 is the mass-flowmeter. As the mass-flowmeter, one having heretofore been commercially available can be used without any change. The gas flow rate control employing the gas-flowmeter will now be briefly explained.

A gas fed in along arrow 13 has the value of the flow rate detected by a sensor 22, and the value is inputted to a gas flow rate controlling circuit 24. On the other hand, a signal from a potentiometer 23 is also inputted to the gas flow rate controlling circuit 24. Both of the input signals are compared and processed by the gas flow rate controlling circuit. An output signal from the gas flow rate controlling circuit 24 is inputted to a flow rate control element 21. The flow rate is set to a desired value by a signal of the control element so as to feed the gas into a protection tube 3. In addition, the output signal of the gas flow rate controlling circuit 24 is indicated on a digital indicator 25. The potentiometer 23 is directly coupled to the shaft of a motor 15 so as to input the quantity of a rotational displacement of the motor 15 to the gas flow rate controlling circuit 24 in the form of the quantity of a resistance change of the quantity of a voltage change. Instead of employing the potentiometer 23, an output signal obtained by operating and processing (addition or subtraction) the output $V_o$ of a fiber diameter controlling circuit 7 may be inputted to the gas flow rate controlling circuit 24. As the operating and processing method in this case, the voltage corresponding to the flow rate value F initially set and the above voltage $V_o$ may be inputted and operated.

Further, although the fiber diameter controlling circuit 7 shown in FIG. 6 and the take-up speed controlling circuit 20 shown in FIG. 7 have been exemplified as circuits for proportional operations, they may be circuits for proportion and integration, circuits for proportion, integration and differentiation, or circuits for proportion and differentiation.

Although the embodiments of this invention have been described of the optical fiber drawing process employing the rod-like preform, it is to be understood that the fiber diameter controlling mechanism of this invention is applicable to the optical fiber drawing process based on the crucible method and also to a case of drawing an optical fiber from a pipe-like preform.

What is claimed is:

1. In an apparatus for producing an optical fiber comprising means for heating an optical fiber preform, means for drawing out the optical fiber from said preform whose fore end part has been made molten by said heating means and for taking up the drawn out fiber, means for causing gas to flow along an outer peripheral surface of the molten part of said preform, and means for regulating both flow rate of said gas and drawing out speed of said optical fiber according to fluctuations in diameter of said optical fiber, the improvement comprising said regulating means including i) fiber diameter detector means for detecting the diameter of the optical fiber drawn out, ii) fiber diameter measuring means for measuring the optical fiber diameter detected by said detector means, iii) fiber diameter controlling circuit means for receiving and for comparing an output of said fiber diameter measuring means and a reference value for setting a fiber diameter to generate a fiber diameter controlling output, iv) gas flow rate controller means responsive to said fiber diameter controlling output for controlling gas flow, v) take-up speed controlling circuit means for receiving and for comparing a signal corresponding to said fiber diameter controlling output and a reference value for setting a take-up speed to generate a take-up speed controlling output, and vi) optical fiber take-up speed controller means responsive to said take-up speed controlling output for controlling take-up speed.

2. Apparatus for producing an optical fiber as defined in claim 1, wherein a gas flow rate regulating mechanism of said gas flow rate controller means includes a motor which is driven by said fiber diameter controlling output, and a valve regulator which is coupled to said motor through a power transmission mechanism.

3. Apparatus for producing an optical fiber as defined in claim 1, comprising a mass-flowmeter as a gas flow rate regulating mechanism of said gas flow rate controller mechanism.

4. Apparatus for producing an optical fiber as defined in claim 1, wherein a mechanism for generating said take-up speed controlling output comprises (i) a motor which is driven by said fiber diameter controlling output, (ii) a potentiometer which is moved by rotation of said motor, and (iii) said take-up speed controlling circuit means which receives a signal corresponding to the fiber diameter fluctuation as outputted from said potentiometer and said reference value for setting a take-up speed and which generates said take-up speed controlling output.

5. Apparatus for producing an optical fiber as defined in claim 4, wherein a gas flow rate regulating mechanism of said gas flow controller means includes a valve regulator which is coupled to said motor through a power transmission mechanism.

6. Apparatus for producing an optical fiber as defined in claim 1, wherein said fiber diameter controlling circuit means receives a voltage as a reference value for setting a fiber diameter and further includes amplification means for amplifying the result of the comparison, said gas flow rate controller means receiving a voltage as a reference value for setting a take-up speed and further including amplification means for amplifying the results of the comparison.

* * * * *